United States Patent
Messing et al.

(10) Patent No.: US 8,260,087 B2
(45) Date of Patent: Sep. 4, 2012

(54) IMAGE UPSAMPLING TECHNIQUE

(75) Inventors: Dean Messing, Camas, WA (US); M. Ibrahim Sezan, Camas, WA (US); Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1428 days.

(21) Appl. No.: 11/821,128

(22) Filed: Jun. 22, 2007

(65) Prior Publication Data

US 2008/0291332 A1 Nov. 27, 2008

Related U.S. Application Data

(60) Provisional application No. 60/897,330, filed on Jan. 24, 2007, provisional application No. 60/897,014, filed on Jan. 22, 2007.

(51) Int. Cl.
*G06K 9/32* (2006.01)
*G09G 5/00* (2006.01)
*G09G 5/02* (2006.01)
*H04N 5/44* (2011.01)
*H04N 9/74* (2006.01)
*H04N 3/223* (2006.01)
*H04N 1/393* (2006.01)

(52) U.S. Cl. ........ 382/298; 382/299; 345/660; 345/698; 348/561; 348/581; 348/582; 348/704; 358/451

(58) Field of Classification Search .................. None
See application file for complete search history.

(56) References Cited

U.S. PATENT DOCUMENTS

| | | | |
|---|---|---|---|
| 7,697,782 B2* | 4/2010 | Pan | 382/275 |
| 2001/0035845 A1* | 11/2001 | Zwern | 345/8 |
| 2003/0086608 A1* | 5/2003 | Frost et al. | 382/173 |
| 2006/0115176 A1* | 6/2006 | Kanamori et al. | 382/266 |
| 2006/0115184 A1* | 6/2006 | Michel | 382/299 |
| 2006/0133686 A1* | 6/2006 | Gomila et al. | 382/254 |

FOREIGN PATENT DOCUMENTS

| | | |
|---|---|---|
| JP | 1-222509 A | 9/1989 |
| JP | 2006-155179 | 6/2006 |

OTHER PUBLICATIONS

Japanese Office Action dated Dec. 14, 2010, for App. No. 2008-012037 (with English translation),, 14 pgs.
Xiaohua Yu et al. Article, Image Reconstruction Using Data-Dependent Triangulation, IEEE Computer Graphics and Application, May/Jun. 2001, 8 pgs.

* cited by examiner

*Primary Examiner* — Randolph I Chu
(74) *Attorney, Agent, or Firm* — Chernoff Vilhauer McClung & Stenzel, LLP

(57) ABSTRACT

An upscaling (upsampling) technique for digital images and video for presentation on a display. An image at a first resolution may be separated into a plurality of channels. Each channel may be upsampled to a higher resolution. The plurality of channels may then be combined to form an image at the higher resolution.

37 Claims, 11 Drawing Sheets

Two channel interpolation with alpha channel

Original image

Figure 1 upsampled by two with bilinear interpolation

Figure 1 upsampled by two with Lanczos interpolation

Upsampling with bilinear interpolation (left) and with the edge adaptive NEDI technique (right)

Original image

Sieve filter output: edges and smooth regions (top) and textures (bottom)

Two channel interpolation

Two channel interpolation with alpha channel

Original image (top) and associated grayscale alpha channel (bottom)

Two channel interpolation with alpha channel

Two channel interpolation with alpha channel

DDT initialization using regular Delaunay triangulation

DDT initialization using randomly oriented diagonals

IMAGE UPSAMPLING TECHNIQUE

CROSS-REFERENCE TO RELATED APPLICATIONS

This application claims the benefit of 60/897,330 filed Jan. 24, 2007 and 60/897,014 filed Jan. 22, 2007.

BACKGROUND OF THE INVENTION

The present invention relates to upscaling (upsampling) digital images and video for presentation on a display.

The resolution of a typical liquid crystal display is approximately 720×480 which is on the order of standard definition television. The resolution of a typical very high resolution diagonal display is 4096×2160 and typically has viewing distances that are less than 2 picture heights. In order to display a lower resolution image on a higher resolution display, the lower resolution image is upscaled (upsampled). Large high resolution displays viewed at close viewing distances tend to have annoying artifacts as a result of upsampling.

The traditional approaches to upscaling generally result in the introduction of visible degradation into the image to be enlarged. The visual degradation is primarily due to several factors. A first factor is related to using inexpensive Linear Shift Invariant (LSI) filters to upsample the image. Such LSI filters remove or attenuate high spatial frequency components in the input image which have the visual effect of blurring the details and results in aliasing which tends to result in various artifacts.

A second factor is related to the introduction of moiré in patterned textures, and spurious patterns and jaggedness along the edges. This results, at least in part, from using inexpensive LSI filters. Larger filter kernels can reduce these artifacts but only at the cost of ringing artifacts around sharp edges within the image. Ringing artifacts are a limitation of upsampling techniques based on LSI filters.

A third factor is the blurring of the edges in the upsampled image. Classical upsampling techniques are unaware of the position of edges and contours within the incoming image. When the upsampling filter encounters a sharp edge contour it simply continues its convolution across the edge, combining image samples on both sides of the edge. The effect is a blurred edge in the upsampled image.

Various improvements to classical upscaling technology have been developed. One class of techniques are edge adaptive techniques that locate the edges and contours within the incoming image and control the filter process near the edges. These techniques can produce an upsampled image with sharp natural looking edge contours. However, edge adaptive upsampling techniques share some drawbacks with LSI filters. One drawback of edge adaptive techniques is that they tend to blur textures (e.g., skin or sand). Another drawback of edge adaptive techniques is that they can mistake non-edge features for edges as a result of edge classification. This introduces local spurious edges that are not in the original, and that are very easily observed as mistakes.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Linear shift invariant (LSI) filtering techniques used for upscaling are known for the introduction of blurred and jagged edges. Also, inexpensive short LSI filters used for upsampling are known for blurring textures that were sharp in the input images. When LSI filters are designed in such a way to avoid undue blurring, then they tend to introduce other spurious and unsightly image artifacts, such as ringing around edges.

Figure 1:
FIG. 1 illustrates an input image.
Figure 2:
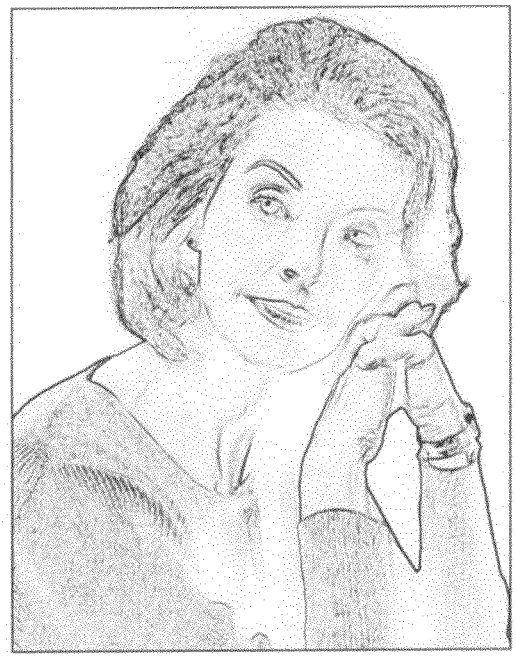
FIG. 2 illustrates up-sampling the image of FIG. 1 by two with bilinear interpolation.
Figure 3:
FIG. 3 illustrates up-sampling the image of FIG. 1 by two with Lanczos interpolation.

By way of example, FIG. 1 illustrates an input image. FIG. 2 illustrates the upsampling of the image of FIG. 1 by a factor of two using a computationally inexpensive bilinear LSI filter. The resulting image in FIG. 2 has noticeable blurring. FIG. 3 is a result of upsampling the image of FIG. 1 by two and using a more computationally expensive Lanczos LSI filter. This filter attempts to reduce blurring by using a wider bandwidth, a sharper transition band, and many filter taps. Textures are well rendered but one observes ringing artifacts around edges, e.g., near the wristwatch, stipling in the eyes, and a "ropey" appearance in the hair. All of these are primarily due to Fourier spectral leakage in the upsampling process as viewed from the Spatial Frequency Domain.

Figure 4:
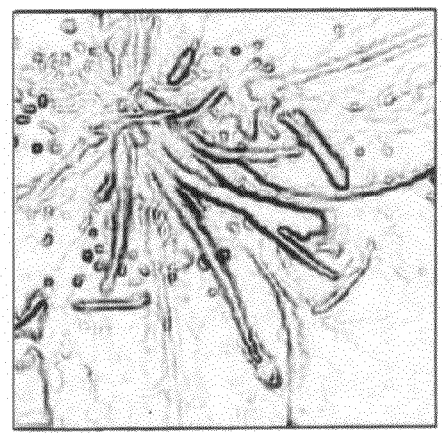
FIG. 4 illustrates up-sampling with bilinear and edge adaptive techniques.
Figure 4:
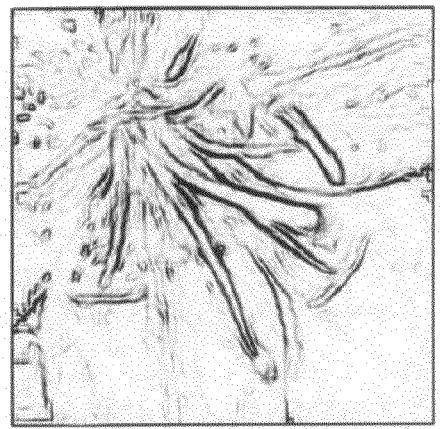

Some non-LSI, edge adaptive techniques reduce this LSI tradeoff. Edge adaptive techniques adapt the upsampling process so that samples on opposite sides of an edge are not combined or averaged to produce the re-sampled image. The power of edge cognizant processing is illustrated by the two images in FIG. 4. The left image has been upsampled with an LSI filter, and the right with the NEDI technique of Li and Orchard. It may be observed that the left image has noise due to spectral leakage, while the right image produces smooth natural looking contours.

Nonetheless, edge adaptive techniques tend to introduce blur in rendered textures as compared with good LSI filters. For example, it would be difficult to produce the well resolved sweater fabrics of the Lanczos interpolated "lady" image of FIG. 3 using an edge adaptive technique. Attempting to develop an improved upsampling filter without tradeoffs has proved to be elusive. It has been determined, that upsampling an image is best done using multiple different filters. Each of the different filters should filter the image in a different manner so that the beneficial aspects of each of the filters may be taken advantage of. It is to be understood that any filter may be used, such as those that increase the resolution.

By way of example, resolution may be generally referred to as the size in pixels of a display medium; the pixels per unit of length (e.g., 45 dots per inch, 300 dots per inch); pixels per screen height or width; and/or pixels per degree of angle subtended on the retina. By way of further example, the enhancement of the resolution may correspond to the increase in the information content of the display. Also, increasing the resolution may refer to the adding of frequency components in newly available high spatial frequency bands created as a result of the upsampling (e.g., denser sampling grid). The enhancement of the resolution of the image as a result of upsampling may improve the ability to resolve the actual scene information from the input image. By way of another example, enhancing the resolution may refer to generally estimating what the image would be if it were acquired by an image capture device with a larger number of pixels than the input image. In this case, the loss of resolution is dominantly due to insufficient number of pixels and in addition possibly optical blur.

Figure 5:
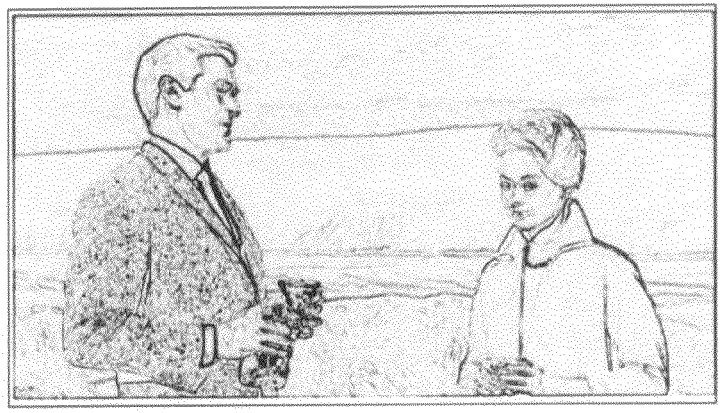
FIG. 5 illustrates another input image.
Figure 6:
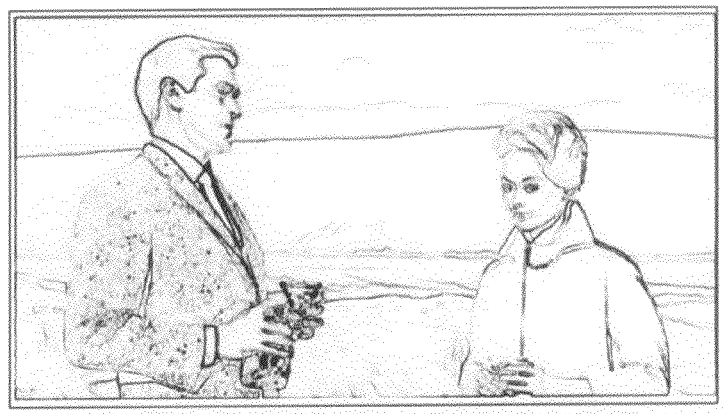
FIG. 6 illustrates edges and smooth regions, and textures.
Figure 6:
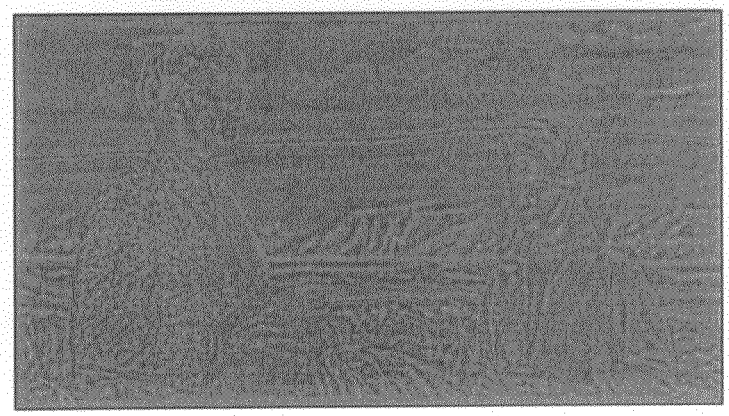

It was determined that the system may preprocess the incoming image with a non-linear filter that separates the image into multiple "channels". It is noted that these "channels" need not be frequency bands, or directly related to the frequency domain. One channel may contain the edge content and slowly varying "flat" regions of the image. The other channel may contain the textures of the image minus edges. The effects of a non-linear filter that was used to separate the image into channels may be illustrated in FIGS. 5 and 6. FIG. 5 is the input image to be applied to a non-linear filter, such as a Sieve Filter. The filter produces two channels as shown in FIG. 6. The non-linear effects of the filter are seen in the left image where edges (which generally contain high spatial frequencies) are retained and remain generally sharp, but textures (which also contain high spatial frequencies) are generally filtered out and shown on the right image. A linear filter is not suitable for such selective filtering.

Figure 7:
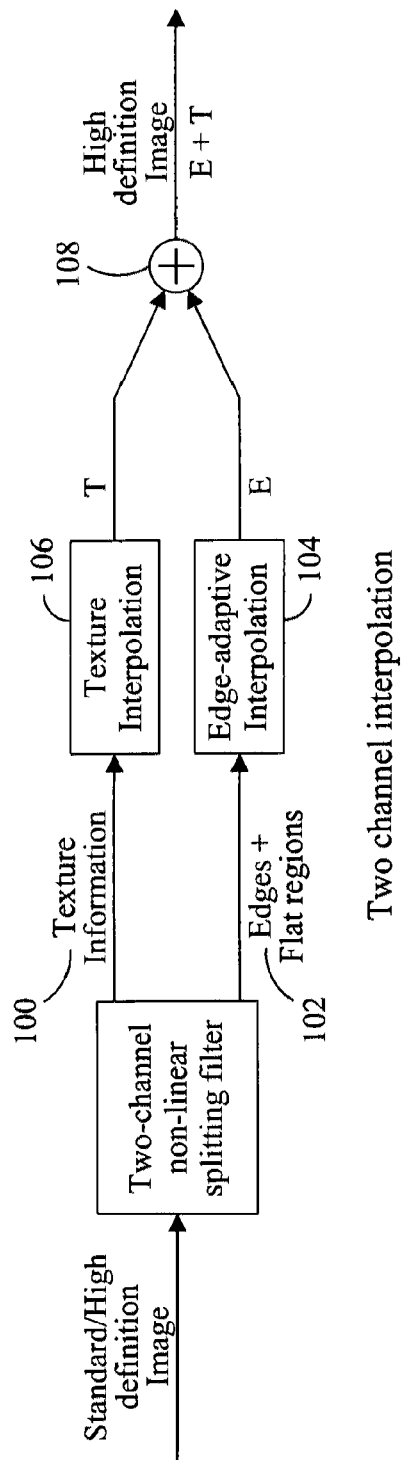
FIG. 7 illustrates two channel interpolation.

Referring to FIG. 7, these two channels, namely, texture information (T) 100 and edge+flat regions 102 (E), can be used in a number of ways to produce a high quality upsampled image. One approach is to use an edge adaptive interpolation technique 104 on one channel and a good (possibly LSI based) texture interpolation technique 106 on the other channel, and then re-combine 108 the two upsampled channels T and E into the final output.

Figure 8:
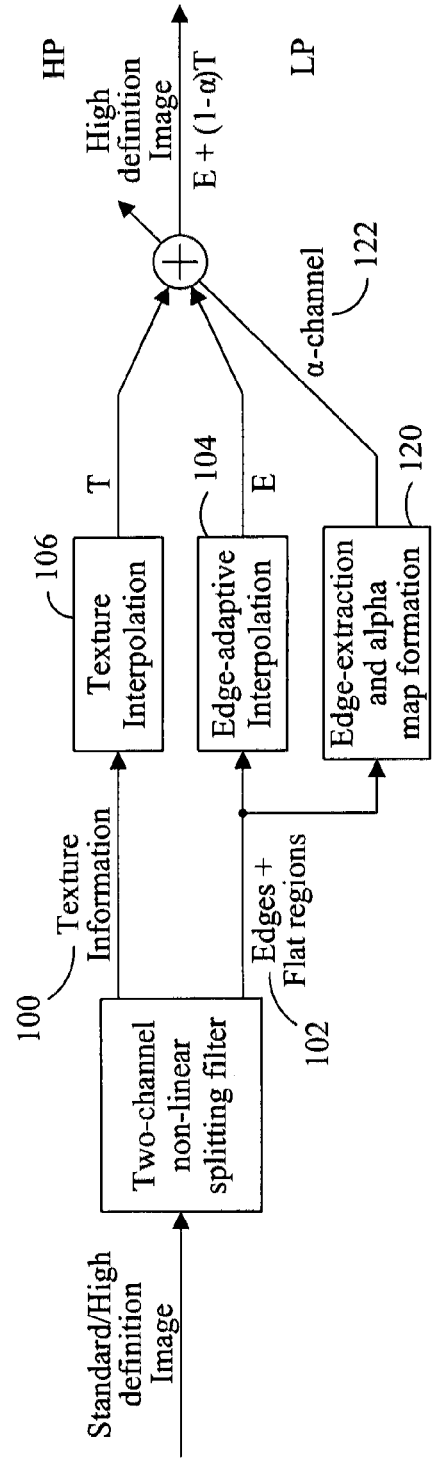
FIG. 8 illustrates two channel interpolation with alpha channel.
Figure 9:
FIG. 9 illustrates yet another input image and grayscale alpha channel.
Figure 9:

Referring to FIG. 8, another approach processes the texture information 100 as shown in FIG. 7. The approach of FIG. 8 determines a binary edge map 120 from which a grayscale blending or alpha channel 122 is formed. FIG. 9 illustrates an example of an input image to be upsampled and its associated grayscale blending channel. The width of the grayscale edges in the alpha channel is determined by the expected width of ringing due to the texture channel filter and the expected amount of visual masking due to the strength of the edge itself.

The blending channel of FIG. 8 is used to blend the adaptively interpolated edge channel 104 with the texture sensitive interpolation channel 106 so as to reduce ringing artifacts (that typically occur near edges) from entering the final image as well as other edge artifacts caused by the texture filter. The addition of the two channels T and E is controlled by the alpha channel 122 so that only (or primarily) regions away from edges in the interpolated texture channel contribute to the final result.

Figure 10:
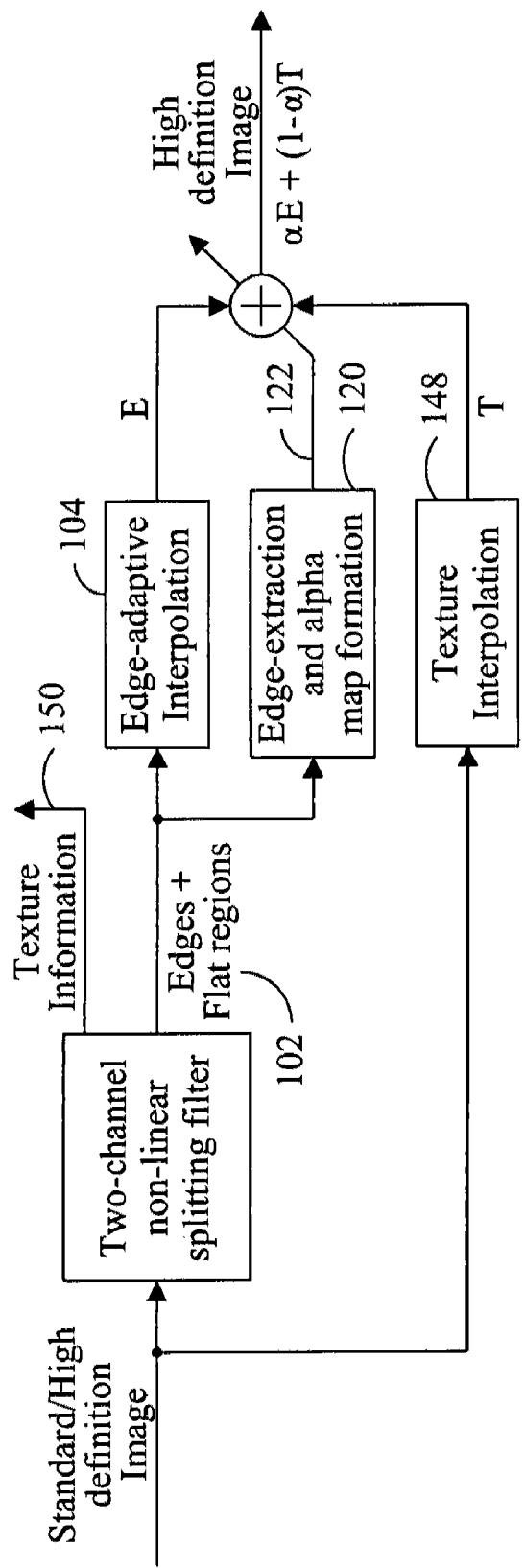
FIG. 10 illustrates another two channel interpolation with alpha channel.

Referring to FIG. 10, another approach is to process the edge adaptive interpolation channel 104 as in FIG. 8 but use the texture information from the incoming original via a texture interpolator 148 instead of using the results of the non-linear filter as the source of texture information 150. Again, one may extract from the edge adaptive interpolation channel 104 a binary edge map from which a grayscale edge blending alpha channel image is formed. Then the grayscale blending alpha channel 122 is used to combine the edge regions of the up-sampled edge adaptive interpolation channel with the texture regions of the texture interpolated channel. The two channel processing reduces the ringing and other artifacts introduced on edges by texture enhanced interpolation. In addition the two channel processing reduces the texture blurring of the edge adaptive interpolation. The texture information 150 may likewise be used, if desired, in the final image.

Figure 11:
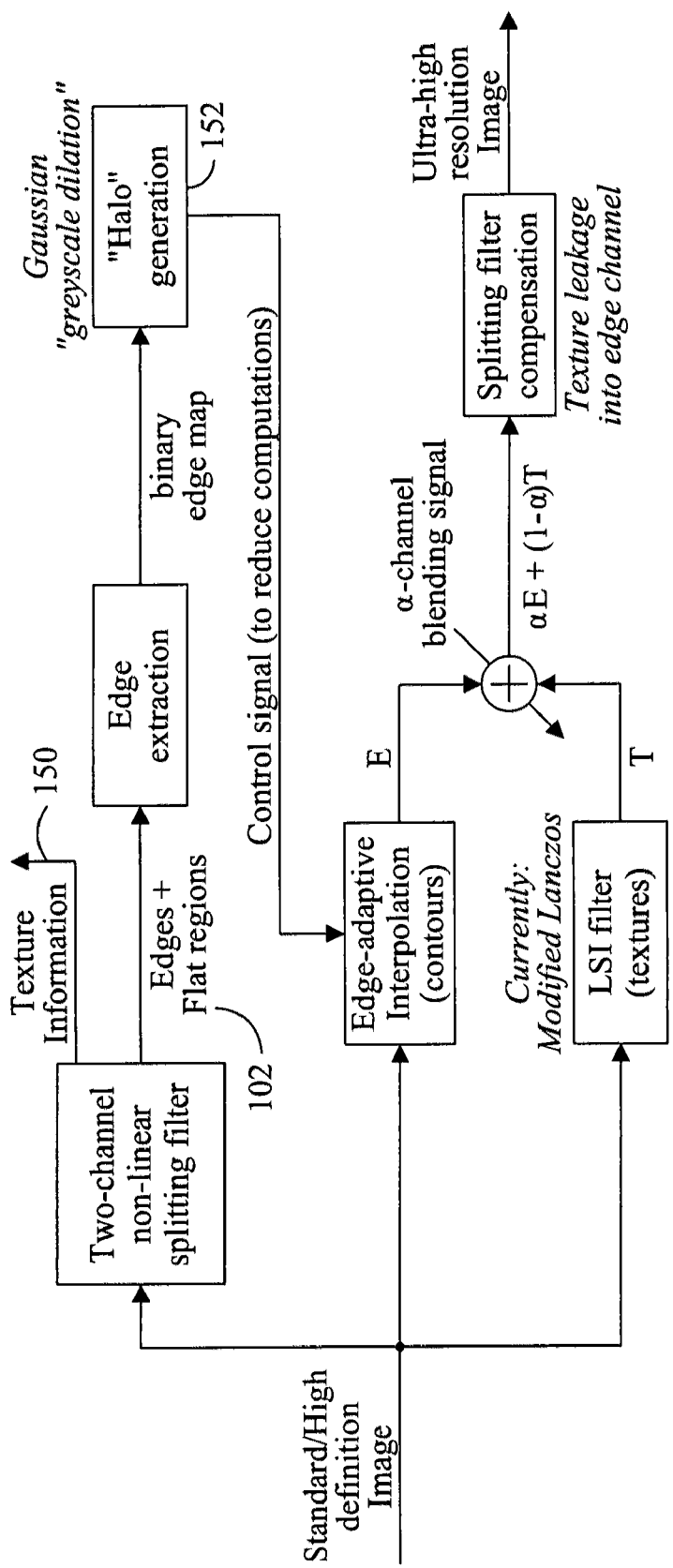
FIG. 11 illustrates yet another two channel interpolation with alpha channel.

FIG. 11 illustrates another approach that uses the edge and flat region channel 102 from the non-linear filter 210 to create the blending map. The input image 220 is processed with an edge adaptive interpolation technique 222 and with a texture interpolator 224. The blending map 226 is then used to combine these two interpolated images E and T so that the rendered edges from the adaptive technique and the rendered textures from the technique appear in the final result.

FIG. 11 may be implemented with a single function block edge-extraction and alpha map formation as illustrated in FIGS. 7, 8, and 10. Halo generation 152 may be the processing of the binary edge map derived by dilating the edges with a Guassian or other desired profile so as to produce a grayscale halo around the edges of the incoming image. This halo map ($\alpha$) and its compliment ($1-\alpha$) may be used to linearly combine the E and T signals as defined by $\alpha E+(1-\alpha)T$.

The edge adaptive interpolation is preferably a data dependent triangulation technique, but any suitable technique may be used. The two-channel non-linear sieve filter is preferably used as the non-linear splitting filter, but any suitable technique may be used. The texture information channel of the non-linear splitting filter may be used to add as a percentage, possibly multiplied by ($1-\alpha$), the complement of the blending map, into the final result to further enhance textures.

The edges and flat region channel of the non-linear filter may also be used to reduce the computational complexity of the edge adaptive technique. This is performed by using the edge information, either directly from the edges and flat region channel, or indirectly from the blending map, to control where in the incoming image the edge adaptive technique is performed. Since edges are sparse in most images, this may substantially reduce the computational requirements.

In many cases, the non-linear splitting filter will not exactly separate the edges from the textures. Accordingly, some information will leak into each channel from the other channel. Consequently, the blending map may allow textures processed by the edge adaptive scheme into the final result. These textures will be slightly less well resolved than those textures that were properly processed via a texture enhancing interpolation. The framework of FIG. 11 may include a post processing compensation 230 process to further resolve those textures which were passed in the channel of the non-linear filter and, thus were interpolated by the edge adaptive process.

Figure 12:
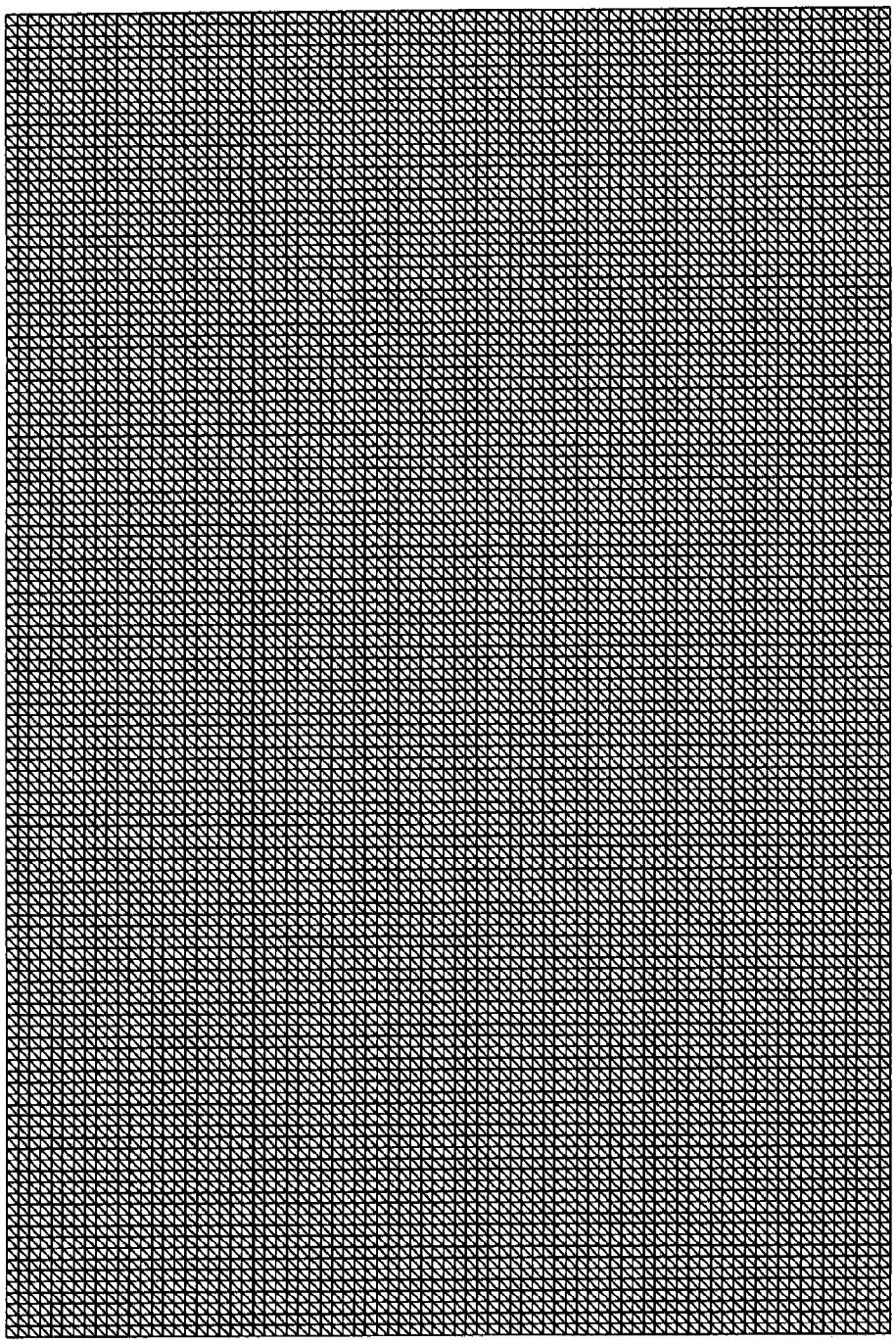
FIG. 12 illustrates DDT initialization.
Figure 13:
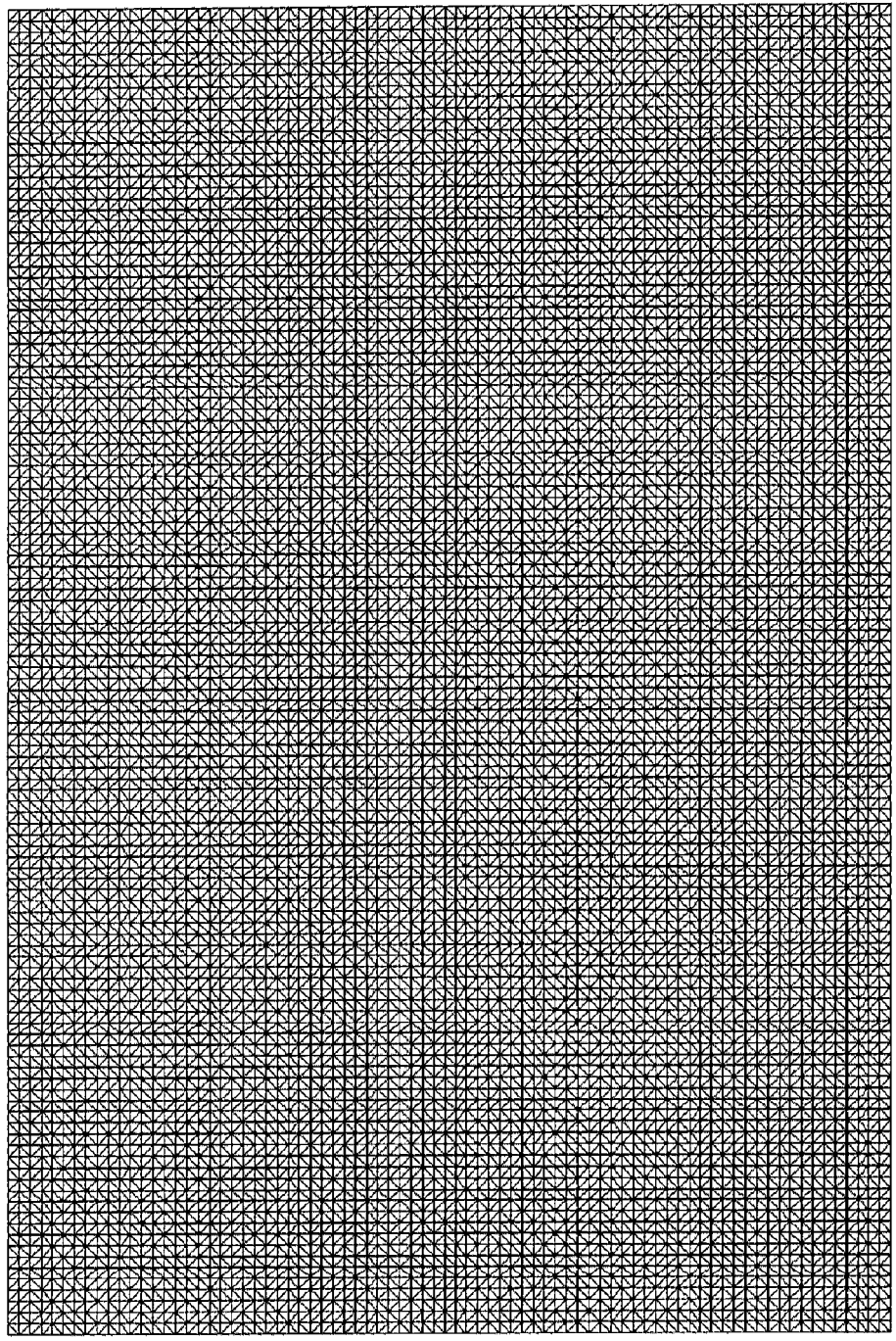
FIG. 13 illustrates modified DDT initialization.

The filter may include a data dependent triangulation (DDT) to perform edge adaptive interpolation, such as described by Yu et al., Image Reconstruction Using Data-Dependent Triangulation, IEEE Computer Graphics and Applications, volume 21, number 3, pages 62-68, 2001, incorporated by reference herein. The DDT technique by Yu, et al. occasionally makes edge classification errors. The initial triangulation is a regular Delaunay triangulation on nodes that are defined by the pixel sites of the incoming image. In this triangulation, the diagonals of every quadrilateral are oriented identically as shown in FIG. 12, and it was determined that this is partially the cause for the classification errors. An improvement may be made in the final rendered image by generating the initial triangulation with randomly oriented diagonals as shown in FIG. 13, or otherwise a set of triangles going different directions. Also, the initial triangulation may be based upon estimates of local edge direction by modification of diagonals.

Figure 14:
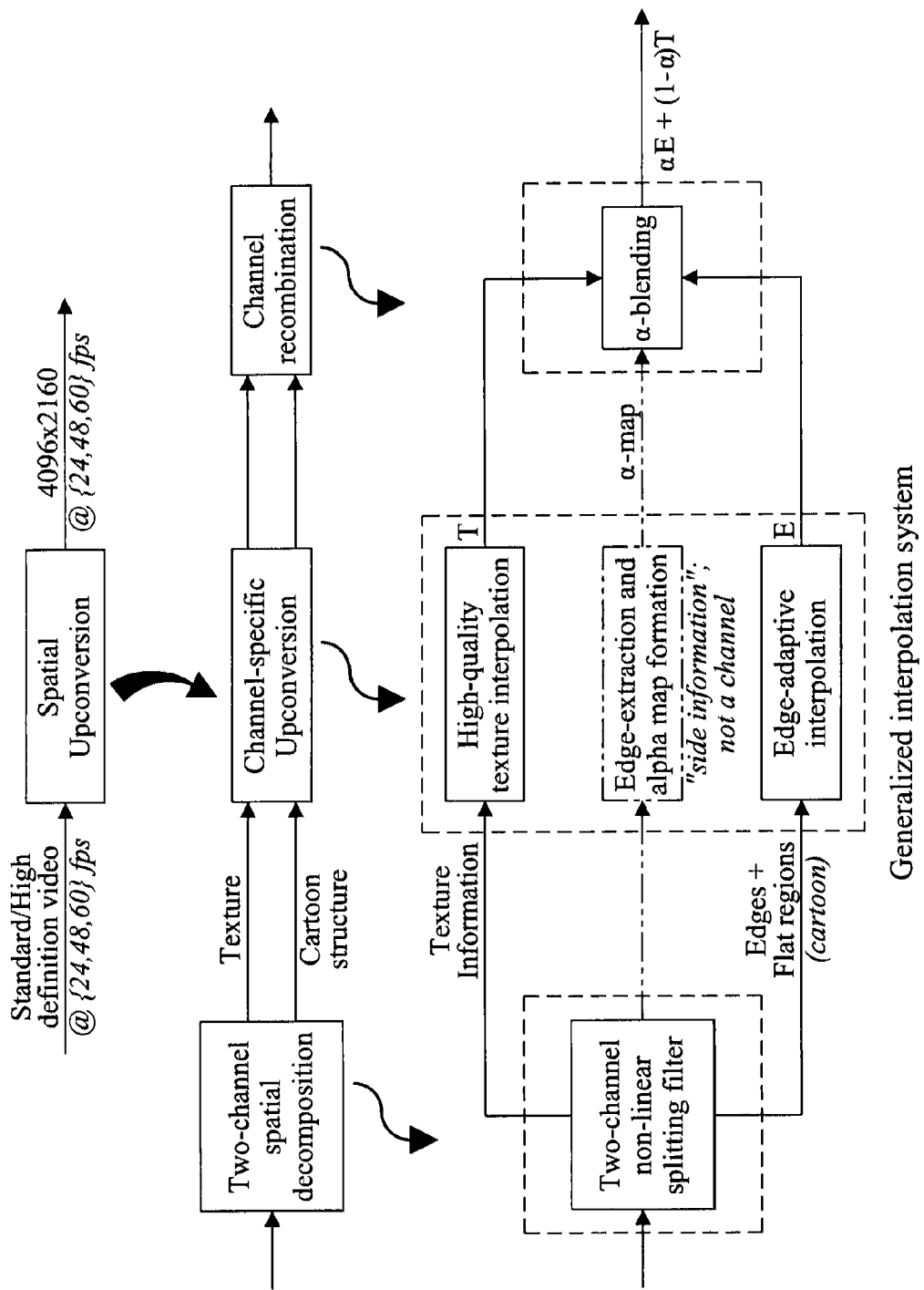
FIG. 14 illustrates a generalized interpolation system.

Referring to FIG. 14, a more generalized framework 300 may be used for an improved interpolation technique. The technique includes a two-channel spatial decomposition 310 which may decompose the image into any suitable set of channels. The decomposition may be linear or non-linear. In addition, the spatial decomposition may be more than two channels, if desired. The channels may include characteristics, such as for example, graphics versus natural, text versus non-text, face versus non-face, texture, and edges+flat region, scrolling text, film grain noise. Depending on the particular implementation, the input image for one or more channels may not be filtered but rather interpolated in any manner. The channel specific interpolation (up-conversion) 320 may use any suitable set of filters. If desired, the filters may also include temporal information of a video when filtering a particular image. This may be especially useful for handling text, and for film grain noise. For example, the system may include texture interpolation 330, edge adaptive interpolation 340, or other interpolation techniques suitable for the particular channel. In addition, alpha maps 350 may be formed for one or more channels and used for blending the various channels of the images together. Blending 360 together of the separate channels may be done using any suitable technique, together with one or more blending channels 370, if desired. Also the data dependent triangulation may be initialized by estimates of local edge direction by modification of diagonals.

Figure 15:
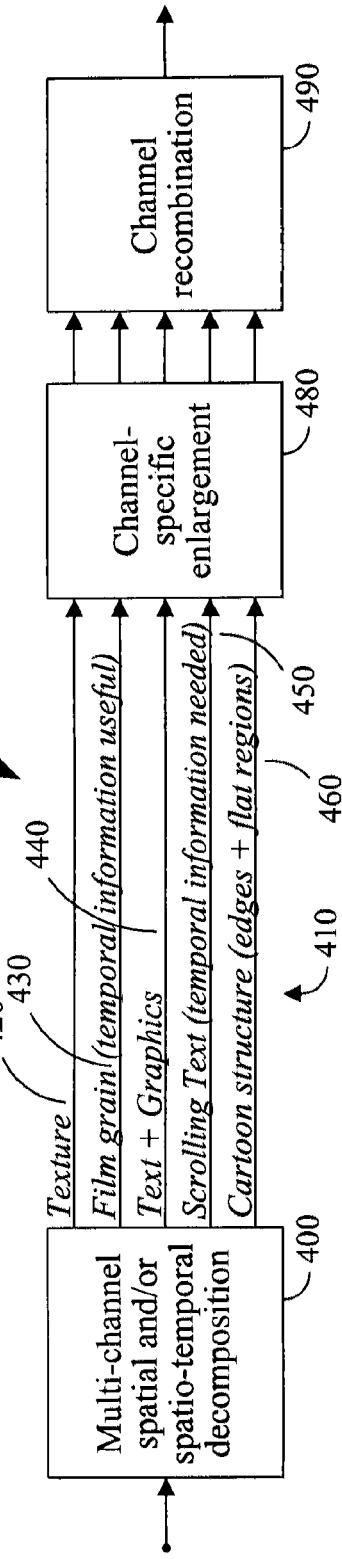
FIG. 15 illustrates a multi-channel framework.

Referring to FIG. 15 another generalized framework is illustrated. The framework includes two or more spatial and/or spatio-temporal and/or temporal decomposition 400. The filters 410 for the channels may be selected to enhance particular characteristics. The channels may be selected, such that they enhance, texture 420, film grain 430 (temporal information is useful for filtering film grain), text and graphics 440, scrolling text 450 (temporal information is useful for filtering scrolling text), and a cartoon structure 460 (edges plus flat regions). Each of the channels, or combinations of multiple channels, may be separately enlarged 480 in a suitable manner. The enlarged channels are then recombined 490 in a suitable manner.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for modifying an image from a first resolution to a modified image having a greater second resolution:
   (a) receiving said image having said first resolution;
   (b) filtering said image with a non-linear filter to create a first channel and a second channel, wherein said first channel includes primarily texture information and said second channel includes primarily edge and flat region information;
   (c) interpolating said first channel to a greater resolution using a first filter;
   (d) interpolating said second channel to a greater resolution using a second that is different from said first filter;
   (e) combining said first channel and said second channel to form said modified image having said second resolution.

2. The method of claim 1 wherein said non-linear filter is a sieve filter.

3. The method of claim 1 wherein said first filter is a linear filter.

4. The method of claim 1 wherein said second filter is a non-linear filter.

5. The method of claim 1 wherein said combining is further based upon blending mechanism.

6. The method of claim 5 wherein said blending mechanism includes edge information.

7. The method of claim 6 wherein said edge information includes grayscale information.

8. The method of claim 5 wherein said blending mechanism acts in such a manner so that primarily regions away from edges in said first channel contribute to said modified image.

9. The method of claim 5 wherein said non-linear filter creates a third channel.

10. The method of claim 9 wherein said combining includes said first channel, said second channel, and said third channel to form said modified image having said second resolution.

11. A method for modifying an image from a first resolution to a modified image having a greater second resolution:
   (a) receiving said image having said first resolution;
   (b) filtering said image with a splitting filter to create a first channel and a second channel, wherein said first channel includes primarily texture information and said second channel includes primarily edge and flat region information;
   (c) interpolating said first channel to a greater resolution using a first filter;
   (d) interpolating said second channel to a greater resolution using a second that is different from said first filter;
   (e) combining said first channel and said second channel to form said modified image having said second resolution.

12. The method of claim 11 wherein said splitting filter is a non-linear filter.

13. A method for modifying an image from a first resolution to a modified image having a greater second resolution:
   (a) receiving said image having said first resolution;
   (b) separating said image into a first channel and a second channel;
   (c) interpolating said first channel to a greater resolution using a first filter in such a manner that primarily enhances texture information;
   (d) interpolating said second channel to a greater resolution using a second that is different from said first filter and primarily enhances contour information;
   (e) combining said first channel and said second channel to form said modified image having said second resolution.

14. The method of claim 13 wherein said first filter is a linear filter.

15. The method of claim 13 wherein said second filter is a non-linear filter.

16. The method of claim 13 wherein said second filter is data dependent triangulation.

17. The method of claim 13 wherein said second channel is filtered by a non-linear filter prior to said interpolating said second channel.

18. The method of claim 13 wherein said combining is based upon a blending mechanism that is based upon edges of said image.

19. The method of claim 18 wherein said blending mechanism is based upon halo generation.

20. A method for modifying an image from a first resolution to a modified image having a greater second resolution:
   (a) receiving said image having said first resolution;
   (b) separating said image into a first channel and a second channel;
   (c) interpolating said first channel to a greater resolution using a first filter in such a first manner that primary enhances first selected information;
   (d) interpolating said second channel to a greater resolution using a second that is different from said first filter and in such a second manner that primarily enhances second selected information;
   (e) combining said first channel and said second channel to form said modified image having said second resolution.

21. The method of claim 20 wherein said first filter is a linear filter.

22. The method of claim 20 wherein said second filter is a non-linear filter.

23. The method of claim 20 wherein said second filter is data dependent triangulation.

24. The method of claim 20 wherein said second channel is filtered by a non-linear filter prior to said interpolating said second channel.

25. The method of claim 20 wherein said combing is based upon a blending mechanism that is based upon edges of said image.

26. The method of claim 21 wherein said blending mechanism is based upon halo generation.

27. The method of claim 23 wherein said data dependent triangulation includes initial triangulation in different directions.

28. The method of claim 23 wherein said data dependent triangulation is initialized by estimates of local edge direction by modification of diagonals.

29. A method for modifying an image from a first resolution to a modified image having a greater second resolution:
   (a) receiving said image having said first resolution;
   (b) separating said image into at least three channels;
   (c) interpolating each of said at least three channels to a greater resolution using respective filters that are different from each other and in such a manner that primarily enhances different selected information;
   (d) combining said interpolated at least three channels to form said modified image having said second resolution.

30. The method of claim 29 wherein at least one of said filters is a linear filter.

31. The method of claim 29 wherein at least one of said filters is a non-linear filter.

32. The method of claim 29 wherein said combing is based upon a blending mechanism that is based upon edges of said image.

33. The method of claim 29 wherein at least one of said filters is for texture.

34. The method of claim 29 wherein at least one of said filters is for film grain.

35. The method of claim 29 wherein at least one of said filters is for text and graphics.

36. The method of claim 29 wherein at least one of said filters is for scrolling text.

37. The method of claim 29 wherein at least one of said filters is for edges and flat regions.

* * * * *

UNITED STATES PATENT AND TRADEMARK OFFICE
CERTIFICATE OF CORRECTION

| | | |
|---|---|---|
| PATENT NO. | : 8,260,087 B2 | Page 1 of 1 |
| APPLICATION NO. | : 11/821128 | |
| DATED | : September 4, 2012 | |
| INVENTOR(S) | : Dean Messing et al. | |

It is certified that error appears in the above-identified patent and that said Letters Patent is hereby corrected as shown below:

Col. 6, Line 2
Change  "using a second that is different from said first filter;"

to read  --using a second filter that is different from said first filter;--;

Col. 6, Line 38
Change  "using a second that is different from said first filter;"

to read  --using a second filter that is different from said first filter;--;

Col. 6, Line 52
Change  "using a second that is different from said first filter;"

to read  --using a second filter that is different from said first filter;--;

Col. 7, Line 12
Change  "using a second that is different from said first filter;"

to read  --using a second filter that is different from said first filter;--.

Signed and Sealed this
Eighth Day of January, 2013

David J. Kappos
*Director of the United States Patent and Trademark Office*